United States Patent
Lo et al.

(10) Patent No.: US 8,132,002 B2
(45) Date of Patent: Mar. 6, 2012

(54) FAST SYSTEM CALL METHOD

(75) Inventors: Shi-Wu Lo, Chia-Yi (TW); Tien-Fu Chen, Chia-Yi (TW)

(73) Assignee: Shi-Wu Lo, Chia-Yi (TW)

( * ) Notice: Subject to any disclaimer, the term of this patent is extended or adjusted under 35 U.S.C. 154(b) by 1333 days.

(21) Appl. No.: 11/505,347

(22) Filed: Aug. 17, 2006

(65) Prior Publication Data
US 2008/0046725 A1 Feb. 21, 2008

(51) Int. Cl.
*G06F 21/00* (2006.01)
(52) U.S. Cl. .......................... 713/164; 717/159; 717/133
(58) Field of Classification Search .................... 713/164
See application file for complete search history.

(56) References Cited

U.S. PATENT DOCUMENTS

| | | | | |
|---|---|---|---|---|
| 5,948,097 A | * | 9/1999 | Glew et al. ................. | 712/220 |
| 6,745,307 B2 | * | 6/2004 | McKee ........................ | 711/163 |
| 7,360,213 B1 | * | 4/2008 | Alfieri ......................... | 718/100 |
| 2004/0139346 A1 | * | 7/2004 | Watt et al. ................... | 713/200 |

OTHER PUBLICATIONS

IBM TDB; Mealey, BG. Fast Path System Call. Apr. 1, 1994. IBM Technical Disclosure Bulletin, vol. 37 No. 04A, pp. 549-550.*

* cited by examiner

*Primary Examiner* — Taghi Arani
*Assistant Examiner* — Narciso Victoria
(74) *Attorney, Agent, or Firm* — Muncy, Geissler, Olds & Lowe, PLLC

(57) ABSTRACT

A method of a fast system call is provided. First, a logical operation to compute a kernel service routine is used. Then the logical operation result is compared with ciphertext from a key register. At least one input for the logical operation is from the relevant information of the required kernel service routine. For example, the start address of the kernel service routine or the content of the start address of the kernel service routine, or combinations thereof. If the logical operation result equals to the ciphertext of the key register, a switch from a user mode to a kernel mode to read the kernel service routine is allowed. Otherwise, the central processing system executes a corresponding exceptional handler routine. Then the operating system terminates the mode switch request and reports an error to the operating system.

4 Claims, 5 Drawing Sheets

FAST SYSTEM CALL METHOD

BACKGROUND

1. Field of Invention

The present invention relates to a system call implementation. More particularly, the present invention relates to a system call implementation using encryption to control a kernel entry point.

2. Description of Related Art

User mode programs usually require a hardware assistant to switch from a user mode to a kernel mode so that the user mode can have full control of authority over the hardware. The operating system may be divided into two groups: an operating system executed on a virtual machine or an operating system directly executing on the hardware. The operating system executed on the virtual machine, for example JavaOS, completely relies on dynamic checks using software to control the use of pointers and the hardware resources. However, the disadvantage of the foregoing method is the low execution efficiency.

In addition, the operating system directly executed on the hardware greatly relies on the protection provided by the hardware. Therefore, some particular instructions and actions may only be executed by some particular components (usually the kernel) of the system.

Nowadays, most central processing units and operating systems use software interrupt as the foundation for the system call. The software interrupt uses a software dispatch mechanism to call a correct kernel service routine. For example, the Linux uses int 0x80 instruction series to cause system interruption on Intelx86 processor series, and the kernel subsequently executes a corresponding kernel service routine according to the user request.

FIG. 1 illustrates a flowchart of a conventional Linux system calls performed on the Pentium processor. The foregoing method requires five steps in order to complete the system call (step 110 to step 118). First, during step 110, the user mode program to make a system call (for example, int 0x80). In step 112, the content of the 0x80 in the Interrupt Descriptor Table (IDT) is then loaded into the program counter in the kernel space. After loading the new address in the program counter, in step 114, the operating system calls a corresponding kernel service routine in the kernel space according to the designation of the user (usually the value of the AX register stores in the stack). In step 116, the system call operation returns from the kernel service routine to the register in the kernel space. Finally, in step 118, the system call operation switches back from the kernel mode to the user mode.

FIG. 1 uses the software interrupt as the foundation for the system call, which requires complicated, time consumption of the software dispatch mechanism in order to call the correct kernel service routine. In addition, most kernels have a single entry point. Therefore, the foregoing method uses a complicated step for the system call (step 110 to step 118).

Therefore, there is a need for a simplified step for the system call to enhance the execution efficiency.

SUMMARY

It is therefore an aspect of the present invention to provide a simple and safe system call method to enhance the execution efficiency.

It is another aspect of the present invention to provide an encryption of the kernel service routine to restrict the kernel entry point to simplify the system call flow in the operating system.

In accordance with the foregoing and other aspects of the present invention, a fast system call method is provided. First, a logical operation to compute a kernel service routine is used. Then, the logical operation result is compared with ciphertext from a key register. At least one input for the logical operation is from the relevant information of the required kernel service routine. For example, the start address of the kernel service routine or the content of the start address of the kernel service routine, or combinations thereof. If the logical operation result is equal to the ciphertext of the key register, then a switch from a user mode to a kernel mode to read the kernel service routine is allowed. Otherwise, the central processing system executes a corresponding exceptional handler routine. Then the operating system terminates the mode switch request and reports an error to the operating system.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 2:
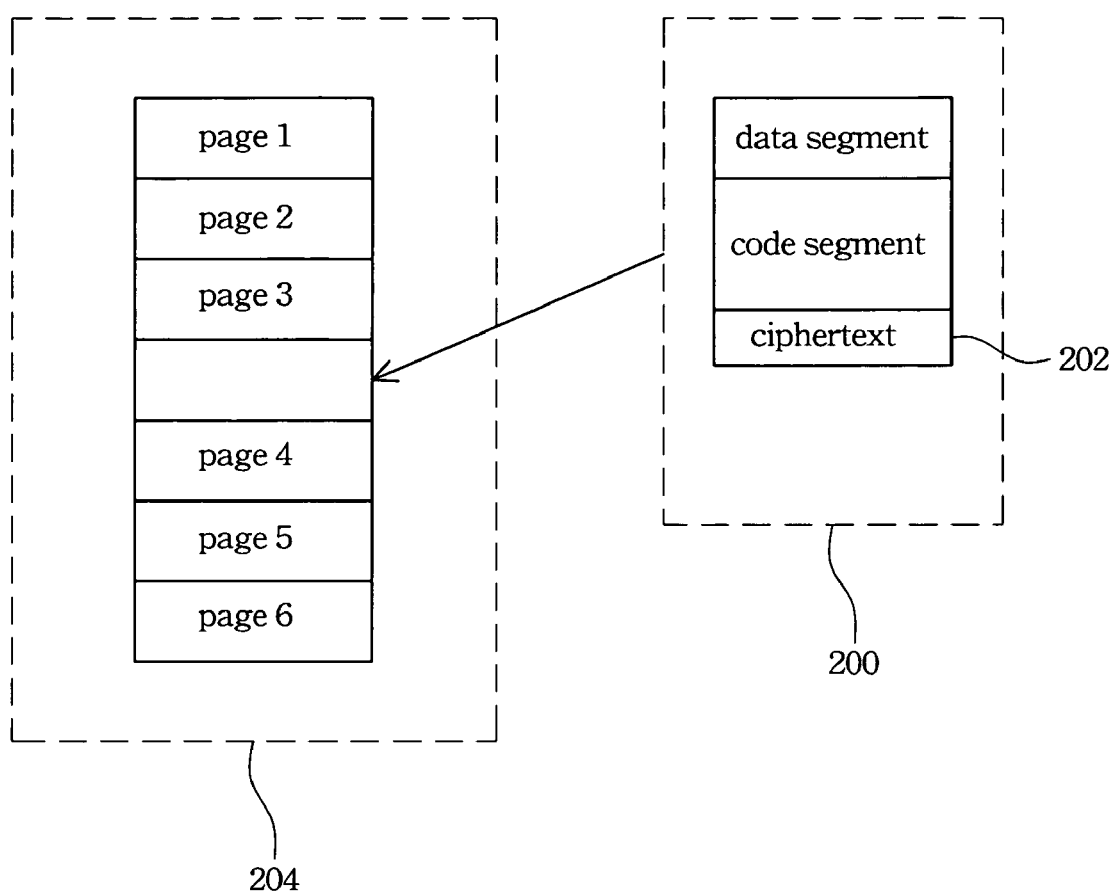
FIG. 2 is a diagram illustrating a kernel service routine with ciphertext according to one embodiment of this invention.

FIG. 2 illustrates a diagram of an encryption in a kernel service routine according to one embodiment of the present invention. Page 202 includes a ciphertext, and the ordinary user mode program does not have a key to reproduce the ciphertext. The key is kept safe in the system and therefore only a kernel can produce the ciphertext.

The kernel of the system is protected according to one embodiment of the present invention. For example, a malicious program uses a system call to disguise and enter the data buffer in the kernel. Further, if the malicious program obtains the address of the data buffer (for example, the address of the data buffer is 0xCF00044), then the malicious program may uses the jmp 0xCF00044 instruction (which jump to the data buffer address) to execute the program codes illegally. According to one embodiment of this invention, kernel service routines with the ciphertext 202 control the kernel entry point.

Traditionally, the kernel divides all the pages into data pages and code pages to avoid the safety loophole. Referring to FIG. 2, the present invention uses the ciphertext in the kernel service routine to restrict and control the kernel entry point which increases the kernel safety. The data segment and the code segment of the kernel service routine 200 may be stored in the same page in the kernel which results in reducing the internal fragmentation and increases the usage of the kernel memory. In addition, the compiler may use the program counter relative address to enhance the efficiency of the kernel service routine 200.

Figure 3A:
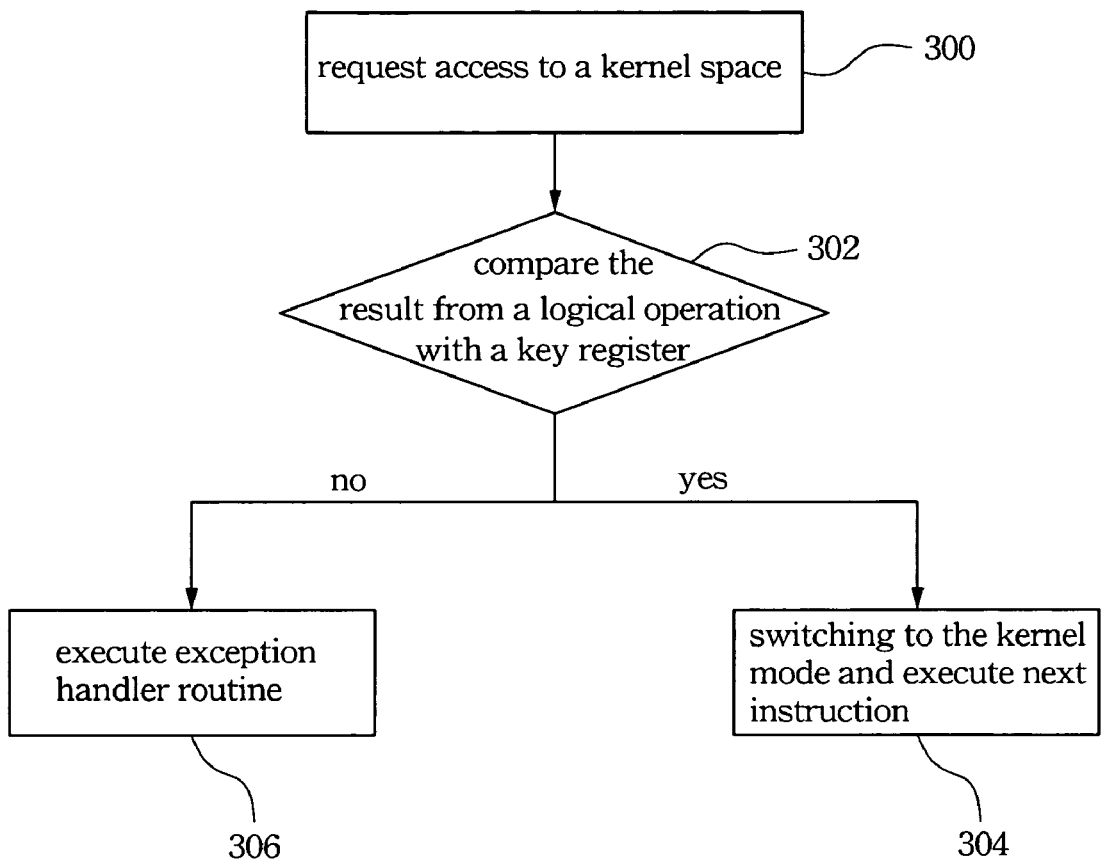
FIG. 3A is a flowchart illustrating a fast system call according to one embodiment of this invention.

FIG. 3A is a flowchart illustrating a fast system call according to one embodiment of this invention. In step 300, a user mode program needs to do a mode switch in order to have the full control of the hardware authority. First, the relevant information from a required kernel service is used for a logical operation. For example, in step 302, the logical operation [for example, AND, OR, NOT, AND-NOT, exclusive OR (Xor), NOT exclusive OR (NOT Xor) operation, or other encryption operations, for example, Data Encryption Standard (DES)] uses the address of the system call and the instruction stores in the address. At least one logical operation input uses the relevant information of the required kernel service routine. For example, the logical operation uses the start address of the required kernel service routine, or the content of the start address of the kernel service routine, or combinations thereof. The result of the logical operation is then compared with ciphertext from a key register. The ciphertext of the key register is randomly designated by the kernel or designate when the kernel compiles. The method and the timescales of the ciphertext designation may be according to the system structure. If the logical operation result equals to the ciphertext from the key register, then step 304 allows the mode switch from the user mode to the kernel mode to have the hardware authority. Otherwise, in step 306, the central processing system executes a corresponding exceptional handler routine. Then the operating system terminates the mode switch request and reports an error to the operation system.

Figure 3B:
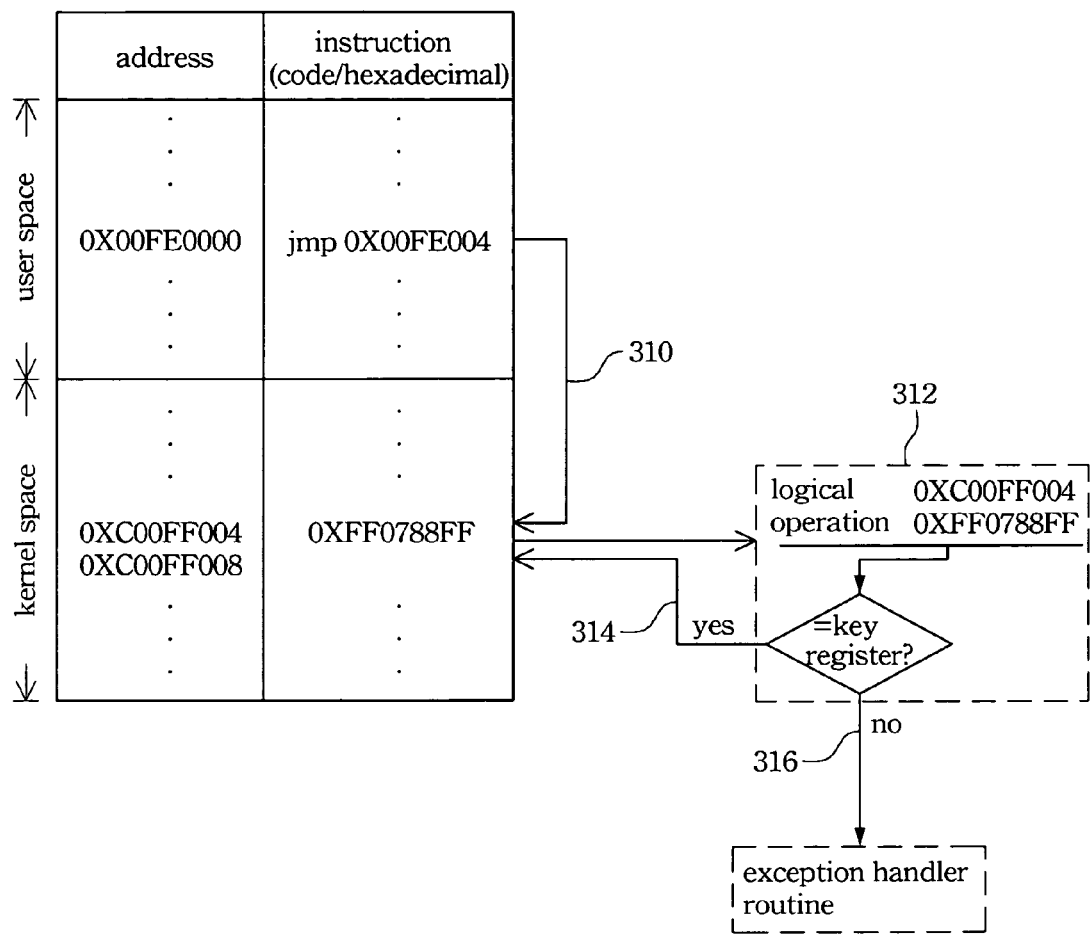
FIG. 3B is a diagram illustrating a fast system call according to one embodiment of this invention.

FIG. 3B illustrates a fast system call according to one embodiment of this invention. In step 310, the user mode program executes the instruction jmp 0xC00FF004 (which the instruction requests access to 0xC00FF004 address) stored in the address 0x00FE0000. However, the address 0xC00FF004 is in the kernel space. Therefore, the central processing unit uses fast system call method of the present invention to handle the mode switch request.

In step 312 of FIG. 3B, the logical operation uses the relevant information of the required kernel service routine. For example, the logical operation uses the instruction 0xFF0788FF stored in the address 0x00FE0004 and the address 0x00FE0004 [for example, AND, OR, NOT, AND-NOT, exclusive OR (Xor), NOT exclusive OR (NOT Xor) operation, or other encryption operations, for example, Data Encryption Standard (DES)]. At least one input of the logical operation uses the relevant information of the required kernel service routine. For example, the logical operation uses the start address of the required kernel service routine, or the content of the start address of the kernel service routine, or combinations thereof. The result of the logical operation is then compared with a ciphertext from a key register. The ciphertext of the key register is randomly designated by the kernel or designated when the kernel compiles.

The method and the timescales of the ciphertext designation may be according to the system structure. In step 314, if the logical operation result equals to the ciphertext from the key register, then the central processing system can switch to the kernel mode. In step 316. If the logical operation result does not equal to the ciphertext from the key register, then the central processing system generates an exception and executes a corresponding exceptional handler routine.

Figure 1:
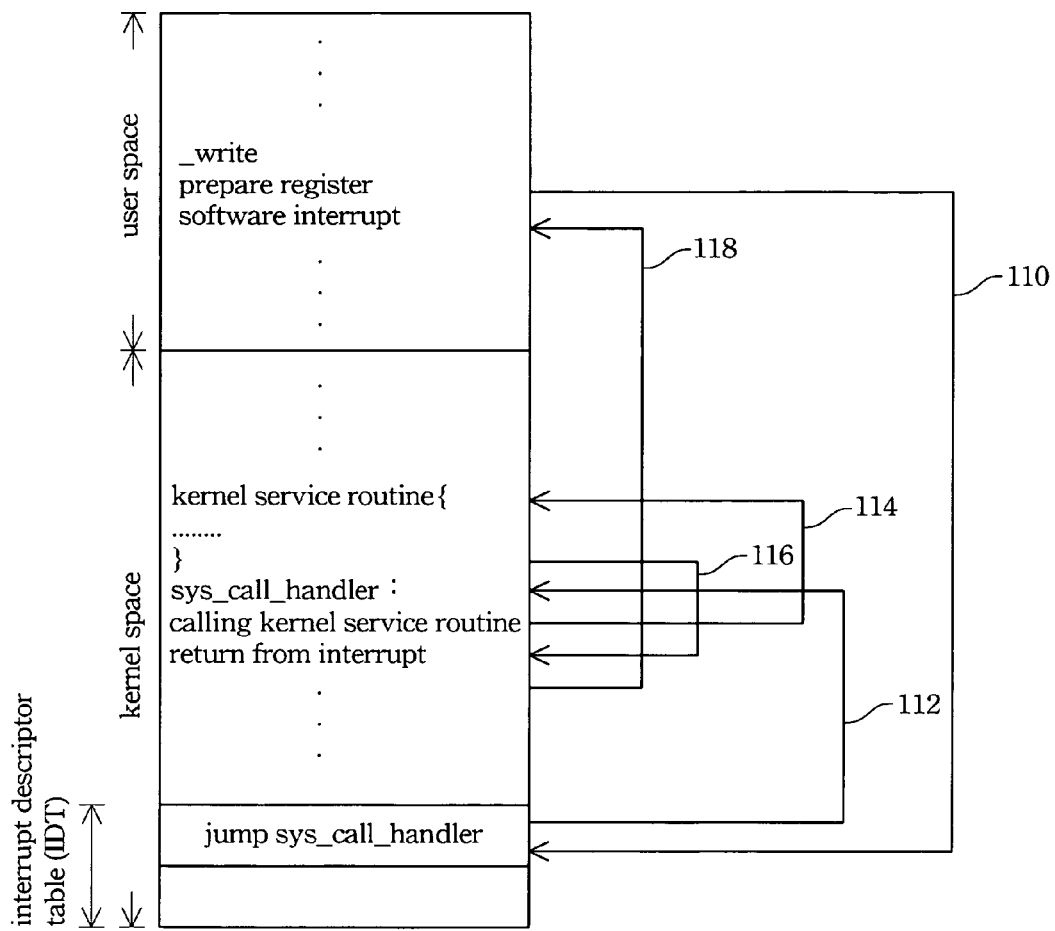
FIG. 1 is a conventional process flow of a Linux system call.
Figure 4:
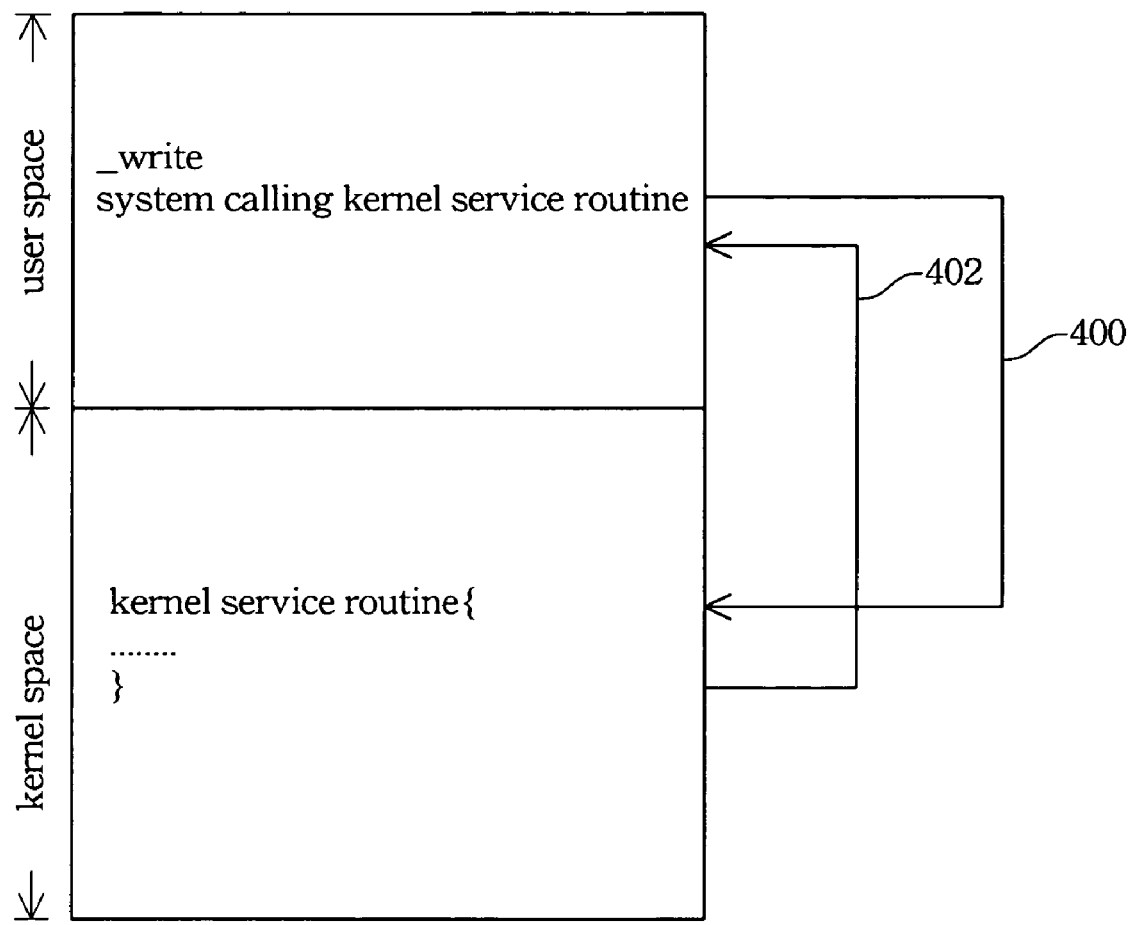
FIG. 4 is a process flow of a fast system call according to one embodiment of this invention.

FIG. 4 illustrates a process flow of a fast system call of one embodiment of the present invention. The kernel entry point is protected by encrypting the relevant information of the kernel service routine to produce the ciphertext. If the logical operation result equals to the ciphertext in the key register, then the central processing system can switch to the kernel mode. From a safety point of view, the foregoing method can directly execute the corresponding kernel service routine (step 400) and directly return back to the user mode (step 402). Therefore, the overhead is smaller than the conventional system call shown in FIG. 1.

The advantages of one embodiment of this invention are listed as follows:
1. The fast system call of this invention uses the encryption method to restrict the entry point of the kernel to further simplify the process of the system call in the operating system.
2. As the present invention uses the encryption to control and restrict the kernel entry point. The hypothesis is not to violate the system safety, then permits to store the code segment and data segment in the same page to reduce the internal fragmentation (which means the smaller kernel).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fast system call method, comprising:
designating a ciphertext in a kernel service routine by a kernel, the ciphertext controlling an entry point to the kernel service routine;
requesting access to the kernel service routine by a user mode program;
computing the kernel service routine using a logical operation to generate a logical operation result;
comparing the logical operation result with the ciphertext; and
directly accessing the kernel service routine through the entry point if the logical operation result is equal to the ciphertext;
wherein the logical operation computes relevant information of the kernel service routine to generate the logical operation result;
wherein the logical operation is an AND operation, an OR operation, a NOT operation, an AND-NOT operation, an exclusive OR operation, a NOT exclusive OR operation, or a Data Encryption Standard, and
executing a corresponding exceptional handler routine if the logical operation result is not equal to the ciphertext.

2. The fast system call method of claim 1, wherein a data segment and a code segment of the kernel service routine are stored in the same page.

3. A fast system call apparatus, comprising:
a kernel for designating a ciphertext in a kernel service routine, the ciphertext controlling an entry point to the kernel service routine;
a user mode program for requesting access to the kernel service routine; means for computing the kernel service routine using a logical operation to generate a logical operation result;

means for comparing the logical operation result with the ciphertext; and means for directly accessing the kernel service routine through the entry point if the logical operation result is equal to the ciphertext, wherein the logical operation computes relevant information of the kernel service routine to generate the logical operation result, wherein the logical operation is an AND operation, an OR operation, a NOT operation, an AND-NOT operation, an exclusive OR operation, a NOT exclusive OR operation, or a Data Encryption Standard, and means for executing a corresponding exceptional handler routine if the logical operation result is not equal to the ciphertext.

4. The fast system call apparatus of claim 3, wherein a data segment and a code segment of the kernel service routine are stored in the same page.

* * * * *